(No Model.)
J. A. KURTZ.
MANUFACTURE OF WINDOW OR PLATE GLASS.
No. 433,410. Patented July 29, 1890.
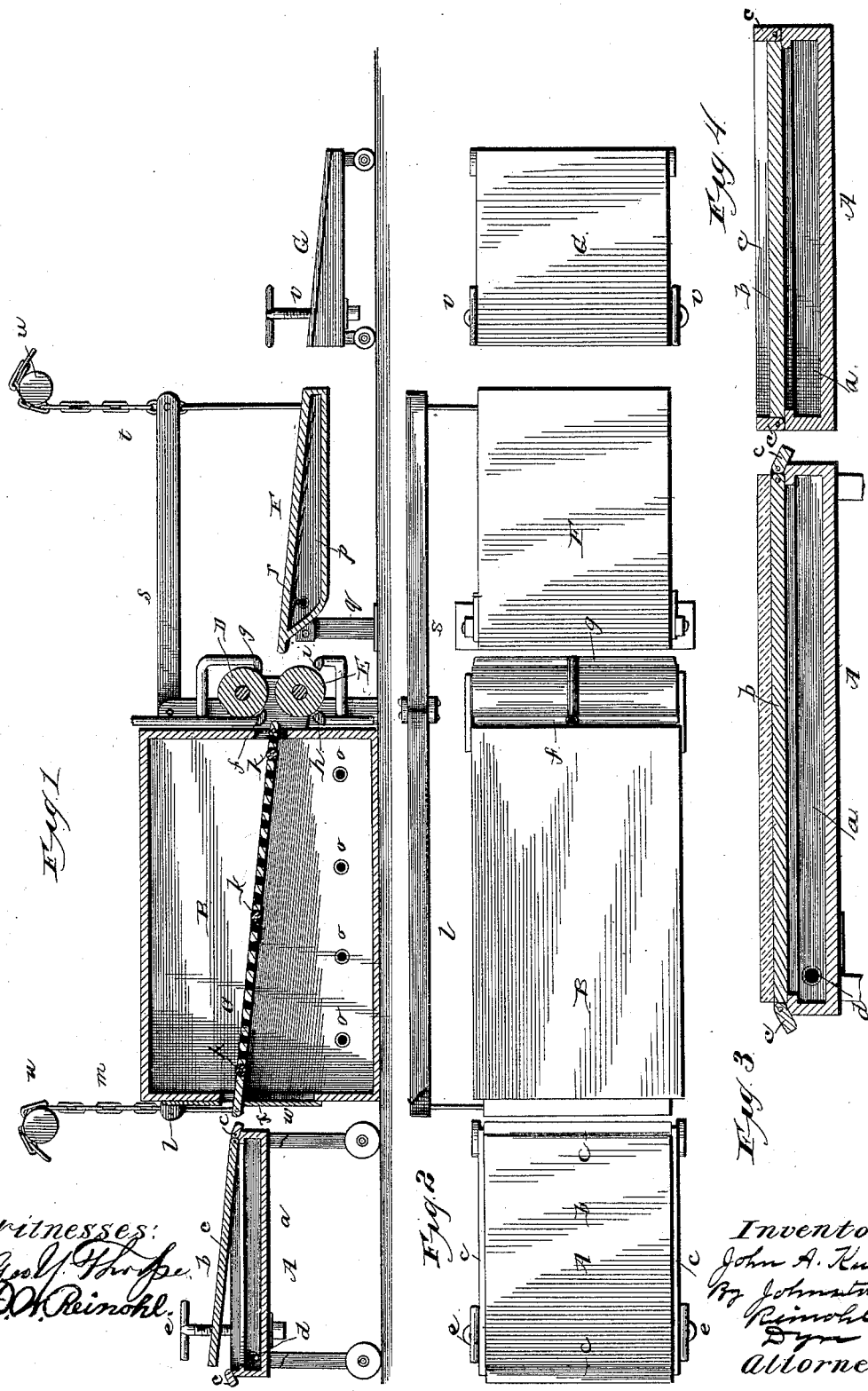

UNITED STATES PATENT OFFICE.

JOHN A. KURTZ, OF ALLEGHENY, PENNSYLVANIA, ASSIGNOR OF TWO-THIRDS TO SIMPSON R. HORNER AND JAMES R. McCLELLAND, BOTH OF SAME PLACE.

MANUFACTURE OF WINDOW OR PLATE GLASS.

SPECIFICATION forming part of Letters Patent No. 433,410, dated July 29, 1890.

Application filed August 5, 1889. Serial No. 319,762. (No model.)

*To all whom it may concern:*

Be it known that I, JOHN A. KURTZ, a citizen of the United States, residing at Allegheny, in the county of Allegheny and State of Pennsylvania, have invented certain new and useful Improvements in the Manufacture of Window or Plate Glass; and I do hereby declare the following to be a full, clear, and exact description of the invention, such as will enable others skilled in the art to which it appertains to make and use the same.

My invention relates to the manufacture of window or plate glass, and has for its object improvements in the method and means employed for said purpose.

The invention will be hereinafter described, and particularly pointed out in the claims.

In the accompanying drawings, which form part of this specification, Figure 1 represents a vertical longitudinal section; Fig. 2, a plan view; Fig. 3, an enlarged sectional view of the mold, and Fig. 4 a transverse sectional view of the mold.

Reference being had to the drawings and the letters thereon, A indicates a mold provided with a heating-chamber $a$, a vertically-adjustable table or top $b$, pivoted at one end, and sides and ends $c$ for regulating the thickness of the plate or sheet of glass formed in the mold. The mold may be heated in any approved manner, but preference is given to gas introduced through the pipe $d$. The sides and ends $c$ may be hinged to the mold, as shown, so that they may be thrown down to enable the plate to be moved from the mold into the furnace B, the sheet or plate being molded to any predetermined thickness.

When the glass sheet in the mold has become sufficiently cool to assume a solid form, it is conducted into the furnace B by raising one end of the top $b$ by means of screws $e\ e$ or other suitable means, as shown in Fig. 1, and raising the upper end of the swinging table C in the furnace B into a position corresponding with the angle of the top $b$ of the mold A, when the plate will gradually move down the inclined table C through the furnace, and passing out of the end thereof it will be caught by the rolls D E and slightly reduced in thickness, and at the same time have a high polish imparted to the surface of the glass by the pressure of the rolls and the effect of the oxygen of the atmosphere mingling with the gas issuing from the burners $f$ $g$ $h$ $i$, which heats the rolls to a proper temperature and also impinges upon the sheet or plate of glass being operated upon and heats it. The rolls may be adjusted to roll sheets or plates of various thicknesses by means common to metal rolls.

The table C is pivoted at the end adjacent to the rolls D E, and is provided with rollers $k$, protruding slightly above its upper surface, for the glass to rest upon, and is raised and lowered by means of a beam $l$, chain $m$, and pulley $n$, or any other approved mechanical means. The furnace B is heated in any approved manner, but preference is given to gas admitted through pipes $o$. After leaving the rolls D E the glass passes onto a flattening-table F, which is provided with a heating-chamber $p$, and is pivotally secured to standards or posts $q$ at one end thereof, and is heated in any suitable manner, preference, however, being given to gas introduced through a pipe $r$. The table is raised and lowered to suit the incline of the table C by means of a beam $s$, chain $t$, and pulley $u$, or by any other suitable means.

The details of construction of mechanical appliances for operating the rolls D E, the top $b$ of the mold A, and the tables C and F, form no part of my invention and can be supplied by the skilled mechanic.

After the plate or sheet of glass has been reheated and flattened on the table F it is placed upon the truck G (which is provided with an inclined top adapted to be raised and lowered by the screws $v$) and conducted to an annealing-furnace, (not shown,) where it is properly annealed.

The furnace B may be provided with sight-holes, (not shown,) and the upper end of the table C has a door or apron $w$ attached thereto for closing the opening $x$ in the end of the furnace as the table is raised and lowered.

Having thus fully described my invention, what I claim is—

1. The improvement in the art of manufacturing window or plate glass, which consists in molding a sheet or plate slightly thicker than the completed article, then subjecting it to rolling pressure and heat in the open atmosphere, then flattening the sheet, and finally annealing it, substantially as described.

2. The improvement in the art of manufacturing window or plate glass, which consists in rolling a sheet or plate of heated glass between rolls in the open atmosphere and directing an oxygenated flame upon the glass while passing between the rolls, substantially as described.

3. In a plant for manufacturing window or plate glass, a set of rolls, means for heating the glass before entering the rolls, and means for directing an oxygenated flame upon the glass while passing through the rolls for reducing it, substantially as described.

4. The combination of a heating-furnace having an inclined table within a furnace, a mold having an inclined table or top, and rolls, substantially as described.

5. The combination of a heating-furnace having an adjustable table within the furnace, a mold having an adjustable table or top, and rolls, substantially as described.

6. A heating-furnace having an inclined table secured at one end and vertically adjustable at the opposite end within the furnace, in combination with a set of rolls, substantially as described.

7. A glass-mold having a flat table or top secured at one end and vertically adjustable to form an incline, substantially as described.

8. In a plant for rolling glass, a heating-furnace, in combination with a set of rolls, and a table or pipe for directing flame upon said rolls, substantially as described.

9. In a plant for rolling glass, a heating-furnace, in combination with a table in the furnace, a set of rolls outside and at one end of the furnace, and a plurality of tubes or pipes for directing flame around said rolls and upon the sheet passing through the rolls, substantially as described.

10. A flattening-table pivotally secured at one end and vertically adjustable at the free end and provided with a heating-chamber, in combination with a set of rolls for delivering a sheet of glass upon the table, substantially as described.

11. A hollow flattening-table in combination with means for heating the interior thereof, substantially as described.

12. In a plant for rolling glass, a mold, a heating-chamber, a flattening-table, rolls between the heating-chamber and the flattening-table, and means for directing a flame upon the rolls, combined and arranged relatively to each other, substantially as described.

13. In a plant for rolling glass, a mold having an inclined top, a furnace or heating-chamber having an inclined table therein, a set of rolls, an inclined flattening-table, and a truck having an inclined top, combined and arranged to operate substantially as described.

In testimony whereof I affix my signature in presence of two witnesses.

JOHN A. KURTZ.

Witnesses:
S. A. TERRY,
D. C. REINOHL.